(12) United States Patent
Parkås et al.

(10) Patent No.: US 12,553,181 B2
(45) Date of Patent: Feb. 17, 2026

(54) METHOD FOR PROCESSING BARK PRESS WATER FROM SAWMILLS AND/OR PULP MILLS

(71) Applicant: Södra Skogsägarna ekonomisk förening, Växjö (SE)

(72) Inventors: Jim Parkås, Varberg (SE); Narcis Mesic, Varberg (SE); Fredrik Solhage, Borås (SE)

(73) Assignee: SÖDRA SKOGSÄGARNA EKONOMISK FÖRENING, Växjö (SE)

( * ) Notice: Subject to any disclaimer, the term of this patent is extended or adjusted under 35 U.S.C. 154(b) by 144 days.

(21) Appl. No.: 18/575,396

(22) PCT Filed: May 4, 2022

(86) PCT No.: PCT/EP2022/061944
§ 371 (c)(1),
(2) Date: Dec. 29, 2023

(87) PCT Pub. No.: WO2023/274604
PCT Pub. Date: Jan. 5, 2023

(65) Prior Publication Data
US 2024/0307825 A1    Sep. 19, 2024

(30) Foreign Application Priority Data
Jul. 2, 2021   (SE) .................... 2150865-0

(51) Int. Cl.
*D21C 11/00*   (2006.01)
*B01D 61/14*   (2006.01)
(Continued)

(52) U.S. Cl.
CPC .......... *D21C 11/0007* (2013.01); *B01D 61/14* (2013.01); *B27L 1/00* (2013.01);
(Continued)

(58) Field of Classification Search
None
See application file for complete search history.

(56) References Cited

U.S. PATENT DOCUMENTS 2,891,046 A * 6/1959 Zenczak ................. C08L 97/02
                                                      162/77
4,525,284 A * 6/1985 Saalasti .................. B01D 33/04
                                                      210/780
(Continued)

FOREIGN PATENT DOCUMENTS

AU      8166387 A       3/1988
CA      532804 A1   *  11/1956
(Continued)

OTHER PUBLICATIONS

Saunamaki et al., Effluent-free Drum Debarking, 1998, International Environment Conference and Exhibit (Year: 1998).*

(Continued)

*Primary Examiner* — Anthony Calandra
(74) *Attorney, Agent, or Firm* — Tarolli, Sundheim, Covell & Tummino LLP (57) ABSTRACT

A method for processing a bark press water from sawmills and/or pulp mills is disclosed. According to the disclosure, the method comprises
a) filtration of the bark press water to provide a bark press water filtrate having a particle size of less than 100 μm, and b) concentrating the bark press water filtrate to a level of at least 10% dry weight and thereby providing a first fraction of concentrated bark press water, comprising tannic compounds; and a second fraction of purified bark press water.

20 Claims, 9 Drawing Sheets (51) Int. Cl.
    *B27L 1/00*           (2006.01)
    *C02F 103/28*      (2006.01)

(52) U.S. Cl.
    CPC ...... *D21C 11/0021* (2013.01); *D21C 11/0042* (2013.01); *C02F 2103/28* (2013.01)

(56) References Cited

U.S. PATENT DOCUMENTS

2009/0077871 A1\*   3/2009   Gebert .................... C08G 8/04
                                                   44/590
2020/0255758 A1     8/2020   Solhage et al.

FOREIGN PATENT DOCUMENTS

EP           1245613 A2     10/2002
RU          2400357 C2      9/2010
WO    WO-2016120531 A1 \*   8/2016   ......... D21C 11/0021

OTHER PUBLICATIONS

Pekkanen et al., Closing The Water Cycle of Pulp Mills by Evaporating Bleaching and Debarking Effluents, 1997, Minimum Effluent Mills Symposium Proceedings (Year: 1997).\*
International Search Report and Written Opinion for International application No. PCT/EP2022/061944 dated Sep. 1, 2022, 14 pages.
International Preliminary Report on Patentability for International application No. PCT/EP2022/061944 dated May 17, 2023, 7 pages.

\* cited by examiner

FIG. 9d

METHOD FOR PROCESSING BARK PRESS WATER FROM SAWMILLS AND/OR PULP MILLS

CROSS-REFERENCE TO RELATED APPLICATIONS

This application is a U.S. National Stage Application filed under 35 U.S.C. § 371 of PCT/EP2022/061944, filed May 4, 2022, and entitled "METHOD FOR PROCESSING BARK PRESS WATER FROM SAWMILLS AND/OR PULP MILLS", which claims priority from Swedish Patent Application No. 2150865-0, filed on Jul. 2, 2021. The entire contents of each of the above-identified patent applications are incorporated herein by reference.

FIELD OF THE DISCLOSURE

The present disclosure relates to method for processing bark press water from sawmills and/or pulp mills.

BACKGROUND

Within sawmill and pulp mill operations, bark is a heterogenic by-product which is collected, pressed and dried before being used as energy source within the plant or within a local district heating plant.

The harvested bark from sawmills and/or pulp mills is first dewatered by pressing in one or several pressing units, where bark is treated mechanically, and a bark press water is separated from dewatered bark.

To keep the one or several pressing units clean from the bark deposits, a certain amount of water must be added in different positions in order to keep pipes and chutes clean.

The amount of added water in this step varies and depends on season, bark quality, production rates and so forth. Thus, the dry solid content and the amount of the chemical components in the bark press water will vary, and the amount of bark press water which needs to be handled by water treatment facility will also vary. The variations of the amount of bark press water may vary from 0 $m^3$/h to 30 $m^3$/h, which will disrupt the functionality of the water treatment facility and cause higher charge of chemical oxygen demand (COD) in water entering recipient. Another way to handle the variation of composition and amounts of bark press water is to send it to the pulp mill evaporation facility where it is mixed with spent black liquor and evaporated prior to being burnt in a recovery boiler. Again, the large variation of the incoming flow causes unevenness in energy consumption and production rate in the recovery boiler. Further, the amount of non-process elements in the pulping process will increase.

Another problem connected to the bark is the heterogeneity thereof due to the seasonal variations. This is widely discussed, and this results in that the composition of the bark and therefore bark press water will vary during a one-year period, which reduces its processing and the final result thereof.

Bark press water is rich on various valuable components, and these components are also troublesome to handle within a wastewater treatment plant, especially in a biological wastewater treatment plant. Several projects have been started within the industry trying to cope with the wastewater situation within sawmill plants and pulp mill plants, but many of these projects have never been implemented, as the suggested processes were considered to have insufficient industrial applicability as the valuable components have too low concentrations within the bark press water.

However, it is of outermost importance that the environmental footprint for the industry is lowered considerably, and the wastewater handling is one major key factor to consider.

Extraction from bark with solvents such as water, aqueous solvents and lower alcohols may give rise to compounds usually called tannin(s) which can be used as adhesive, bactericide, fire retardant, a pharmaceutical or the like, such processes are for example disclosed in U.S. Pat. No. 5,238,680, EP1071842 and GB2063856. Other components are also known to be extracted from wood fines, e.g. arabinogalactan, which is used in a wide range of commercial applications, e.g. printing, mining, biological research, and food industry. U.S. Pat. No. 5,756,098 discloses one method for extraction of arabinogalactan from wood fines. Common for these methods is that additional water, solvents and/or lower alcohols is added to the bark in order to extract the valuable components. Thus, these processes add to the environmental footprint rather than decreasing the same.

The disclosed process solves these problems resulting in less use of fresh water and energy usage and by-products with even composition and adjusted properties suitable for industrial use.

SUMMARY

An object of the disclosure is to provide an improved method for processing a bark press water from sawmills and/or pulp mills which results in a decreased environmental footprint of wastewater handling.

Another object of the disclosure is to recover valuable components from bark press water.

These and other objects are achieved, in full or at least in part, by a method for processing a bark press water from sawmills and/or pulp mills disclosed herein. According to the disclosure, the method comprises a) filtration of the bark press water to provide a bark press water filtrate having a particle size of less than 100 µm, and b) concentrating the bark press water filtrate to a level of at least 10% dry weight and thereby providing a first fraction of concentrated bark press water, comprising tannic compounds; and a second fraction of purified bark press water.

The first fraction comprising valuable tannic compounds may be used for tanning hides, but also for production of adhesives, bactericides, fire retardants, pharmaceuticals, or the like.

The second fraction of purified bark press water may be sent to biological wastewater plant, returned to the sawmill and/or pulp mill as replacement of process water, as heating or for heat exchanging, but it may also be used for extraction of further valuable components.

According to one embodiment of the disclosure, the bark press water filtrate is concentrated to a level of at least 20% dry weight, of at least 30% dry weight, of at least 40% dry weight, of at least 50% dry weight, or of at least 60% dry weight in the first fraction of concentrated bark press water. According to a further embodiment of the disclosure, the bark press water is concentrated to a level of at least 90% dry weight, at least 95% dry weight, or at least 97% dry weight.

According to one embodiment of the disclosure, the bark press water filtrate after step a) has a particle size of less than 50 µm, or less than 20 µm.

According to another embodiment of the disclosure, a part of the bark press water filtrate from step a) is returned to the sawmill or pulp mill for a debarking step or a bark pressing step.

In another embodiment of the disclosure, the method further comprises adding sulphite salt to the first fraction of concentrated bark press water in a level of 4-25% by weight. In one embodiment of the disclosure, the sulphite salt is added to the first fraction of concentrated bark press water in a level within a range of 4-24% by weight, within a range of 4-22% by weight, within a range of 5-20% by weight, or within a range of 10-15% by weight. These ranges are given as dry weight sulphite salt versus dry weight tannic compounds within the concentrated bark press water.

In one embodiment of the disclosure, the method further comprises drying the first fraction of concentrated bark press water for providing a dry powder product comprising tannic compounds.

In one embodiment of the disclosure, the bark press water, before the filtration step a), is subjected to removal of larger solid particles, in form of stones, bark residues and/or needles. Such a removal may be provided by sedimentation, by screening and/or by centrifugation.

In one embodiment of the disclosure, the concentrating step b) is provided by evaporation. By using a combination of filtration and evaporation, an evenness of the first fraction and the second fraction will be improved over the full calendar year.

In one embodiment of the disclosure, the evaporation is performed at a temperature below 80° C., or below 70° C., or below 60° C. By using a lower temperature for the evaporation results in less condensed tannins with a lower molecular weight (Mw).

In one embodiment of the disclosure, the second fraction of purified bark press water is provided as an evaporated fraction.

In one embodiment of the disclosure, the method further comprises a step of condensing the evaporated fraction to provide a condensate.

In one embodiment of the disclosure, the concentrating of the bark press water filtrate from step a) is, before step b), subjected to membrane filtration.

With the use of membrane filtration between step a) and step b), the variations in the incoming bark press water composition being due to process and/or raw material composition (eg. tannic compound content of bark, tannin compound composition of bark) may be evened out even more, but it may also provide for the possibility to produce products with tannic compounds with tailored compositions.

The membrane filtration may be setup in one or several stages with or without interstage dilution (diafiltration) and using one or several membrane molecular weight cut-offs in these stages. The membrane filtration may be configured to adjust salt content, dissolved sugar content, polysaccharide content of the filtered bark press water prior to evaporation and thereby in the main product. One benefit of always using evaporation in combination with membrane filtration, and not only membrane filtration, is that the flux during membrane filtration often is low when reaching higher dry solids content. Also a pure condensate is produced which may be used as an energy and water source eg. in the sawmill or the pulp mill. When the main product is used for tanning purposes it needs to be even from time to time and not vary too much in terms of tanning capacity. For other applications such as adhesives or specialty chemicals a narrow molecular weight distribution of the tannic compounds in the product may be important. This may be solved by combining filtration, membrane filtration and evaporation. By the term membrane filtration is meant microfiltration and/or ultrafiltration and/or nanofiltration.

In one embodiment of the disclosure, the method further comprises the step of fractionation by distillation of the second fraction of purified bark press water to thereby provide at least two different distillation fractions, comprising highly valuable products.

In one embodiment of the disclosure, the second fraction of purified bark press water, as the evaporated fraction or as the condensate, may be returned to the sawmill and/or pulp mill as replacement of process water, as heating fluid or for heat exchanging. In cold seasons it may for example be used for thawing wood and timber before debarking the wood.

In one embodiment of the inventive method, the bark press water may origin from any tannin containing tree species, such as a acacia, quebracho, pine, larch or spruce, but especially from softwood species like spruce, larch and pine, especially spruce.

Other objectives, features and advantages of the present invention will appear from the following detailed disclosure, from the attached claims, as well as from the drawings. It is noted that the invention relates to all possible combinations of features.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise. The steps of any method disclosed herein do not have to be performed in the exact order disclosed, unless explicitly stated.

As used herein, the term "comprising" and variations of that term are not intended to exclude other additives, components, integers or steps.

As used herein, the term "tannic compounds" means a compound having a composition giving rise to tanning of hides in a tanning process to produce leather. The tannic compounds may also be introduced into adhesives, fire retardants and/or pharmaceutical formulations.

As used herein, the term "purified bark press water" means a bark press water which have been purified from tannic compounds, or at least which has a substantially decreased amount of tannic compounds in comparison with bark press water introduced into the disclosed method.

As used herein, the term "filtration of the bark press water to provide a bark press water filtrate having a particle size of less than 100 μm" (or "less than 50 μm, or less than 20 μm") means that the bark press water has passed a filter with 100 μm (or 50 μm or 20 μm) openings. Thus, depending on form of particle, an elongated particle having a length above 100 μm but with a cross section smaller than 100 μm (or 50 μm or 20 μm) may pass such a filter.

According to a further embodiment of the disclosure, the purified bark press water may have a concentration of tannic compounds below 0.8% dry weight, below 0.4% dry weight, or below 0.2% dry weight, preferably below 0.1% by weight.

As used herein, the term "sulphite salt" refers to a salt of sulphite, bisulphite or metabisulphite, and is chosen from the group comprising sodium sulphite, sodium bisulphite, sodium metabisulphite, potassium sulphite, potassium bisulphite, and potassium metabisulphite.

BRIEF DESCRIPTION OF THE DRAWINGS

The disclosed method will be described in more detail with reference to the appended schematic drawings, which show an example of a presently preferred embodiment of the disclosure.

DETAILED DESCRIPTION

The present invention will now be described more fully hereinafter with reference to the accompanying drawings, in which embodiments of the inventive method are shown. The present invention may, however, be embodied in many different forms and should not be construed as limited to the embodiments set forth herein; rather, these embodiments are provided for thoroughness and completeness, and to fully convey the scope of the invention to the skilled addressee.

FIGS. 1-8 show different process charts of the method according to embodiments of the present disclosure, while FIGS. 9a-9d show different alternatives for the optional membrane filtration step (step d within FIGS. 4, 5, 7 and 8).

As discussed above, bark press water is wastewater from sawmills and/or pulp mills, which usually is sent directly to wastewater treatment plants. After the wood logs is debarked, the bark is dewatered in a bark press, and dried in a bark dryer in order to enhance the fuel value thereof. The dry weight of the bark coming from the debarking plant varies with season, but normally have a dry weight of 15-50%, or more common 25-35% Thereafter the bark is most often compressed to a dry content of 35-70%, 40-60%, 45-55% or 45-50%, and at the same time producing a bark press water. It is this bark press water, a normal wastewater line from sawmills and/or pulp mills, which is the incoming process line of the present disclosed method.

Figure 1:
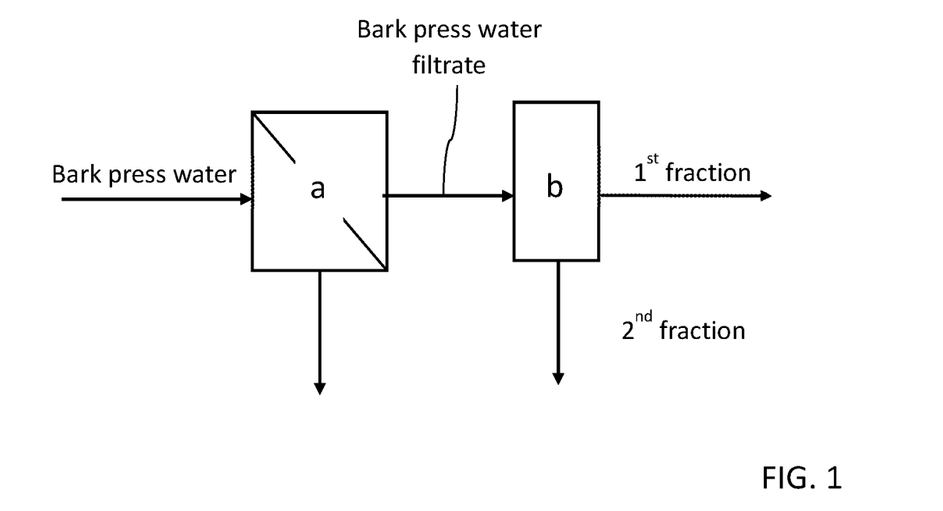
FIGS. 1-8 show process charts of methods according to embodiments of the present disclosure.
Figure 2:
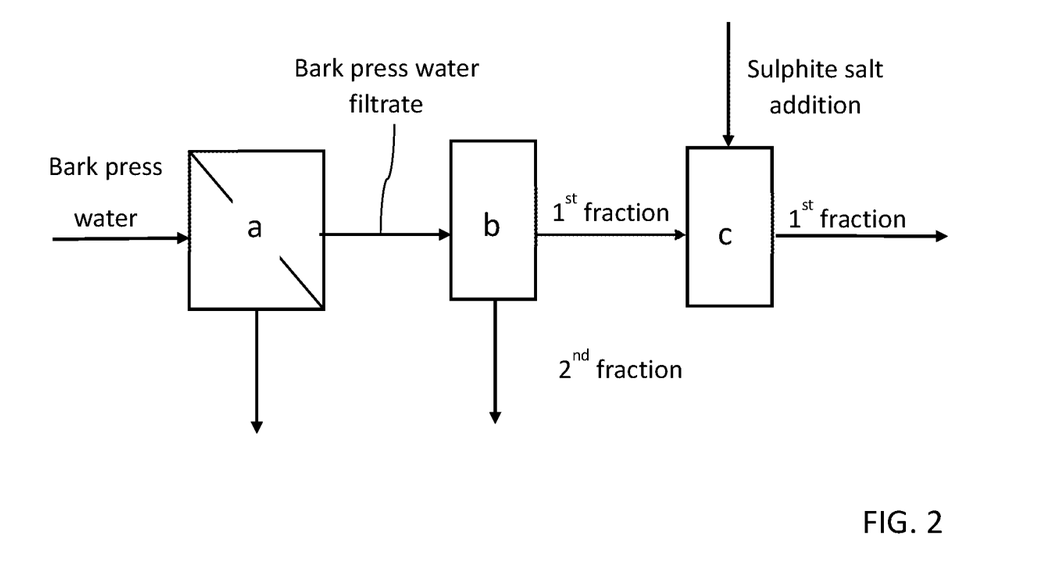

As shown in FIG. 1, the bark press water is first filtrated (step a) to provide a bark press water filtrate and then at least a part of the bark press water filtrate is concentrated (step b) to produce two process fractions, a first fraction of concentrated bark press water, which comprises tannic compounds in a higher concentration than in the incoming bark press water, and a second fraction of purified bark press water. The purified bark press water has been purified or has at least been substantially purified from tannic compounds.

The bark press water may be concentrated to a level of at least 20% by dry weight, of at least 30% dry weight, of at least 40% dry weight, of at least 50% dry weight, or at least 60% dry weight in the first fraction of concentrated bark press water. The concentrating of the bark press water may be provided by evaporation, or by a combination of membrane filtration (step d) and evaporation (step b), which combination will be discussed in more detail below in relation to FIG. 4.

After evaporation, the second fraction of purified bark press water is received as an evaporated fraction. This second fraction of purified bark press water may be condensed into a condensate. The evaporated fraction or the condensate of the purified bark press water, may in one embodiment be returned to the sawmill and/or pulp mill as replacement of process water, as heating fluid, or for heat exchanging, and during cold seasons it may for example be used for thawing wood and timber before debarking the wood logs. The second fraction of purified bark press water may also be sent to a wastewater treatment plant, like a biological wastewater treatment plant. The purified bark press water may now be handled in a biological wastewater plant, as the levels of tannic compounds have been removed or at least decreased to lower amounts. The tannic compounds are known to cause trouble in biological wastewater treatment plants.

Figure 8:
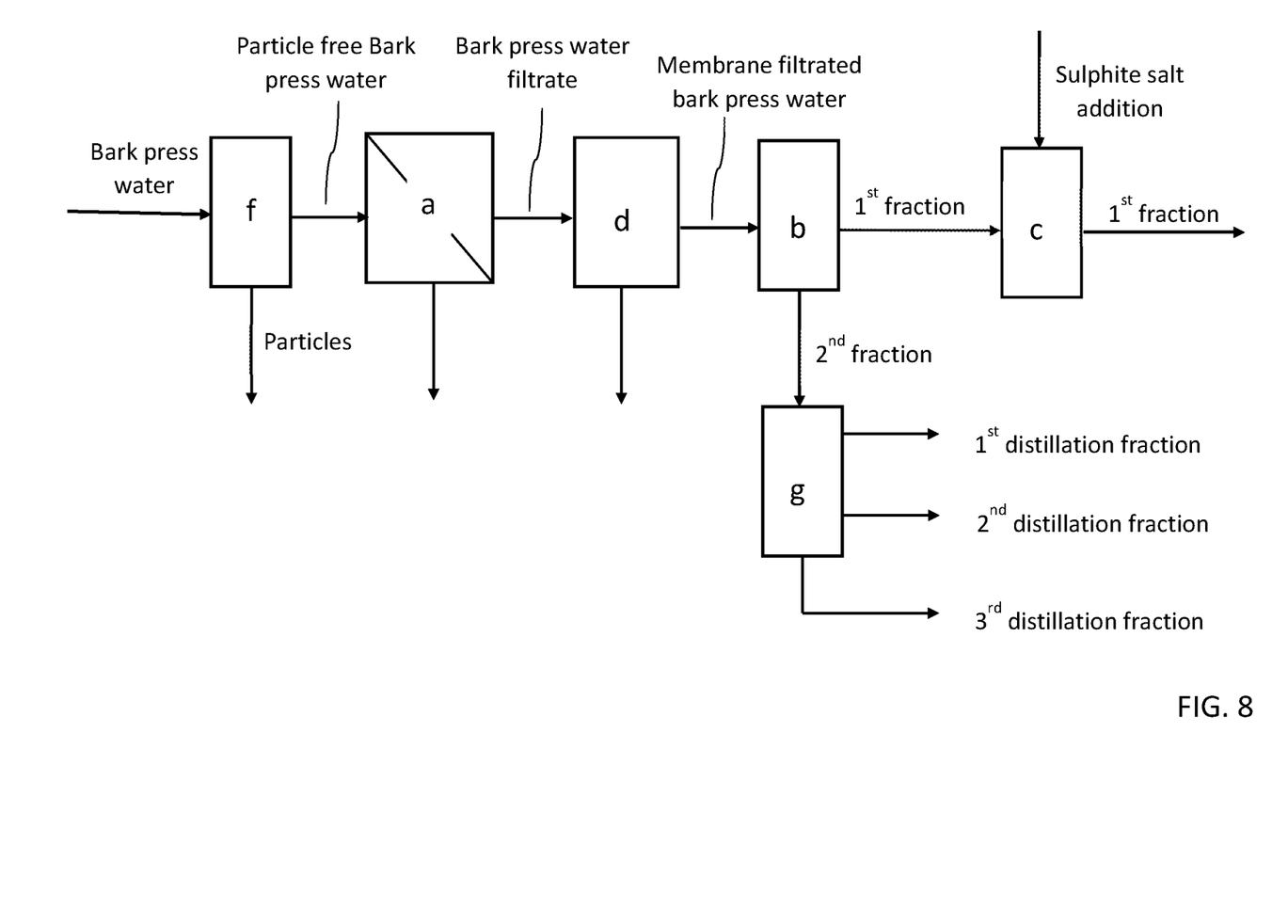
Figure 9A:
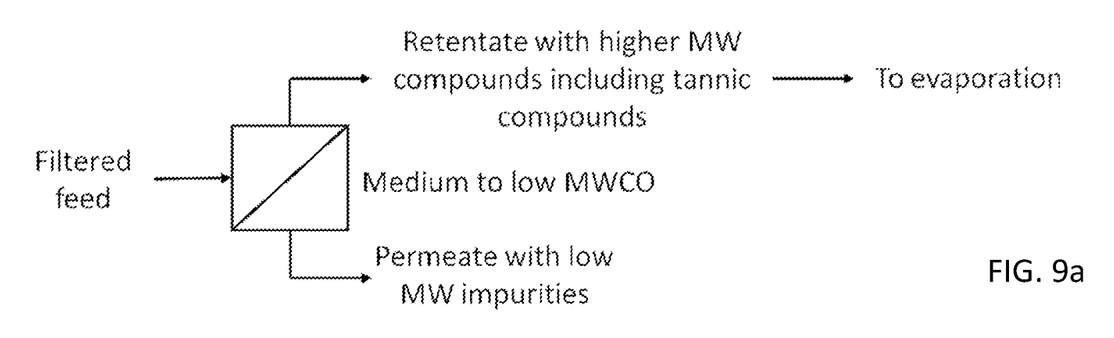
FIGS. 9a-d show different alternatives for the optional membrane filtration step (step d).
Figure 9B:
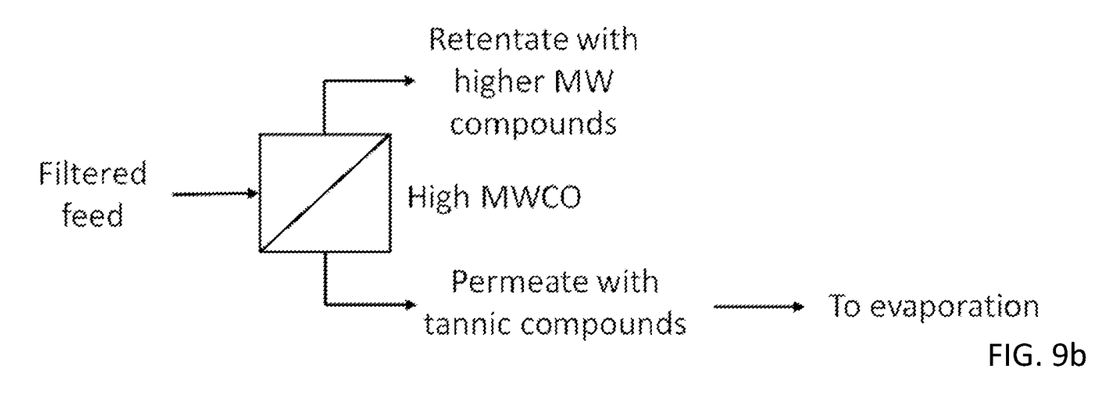
Figure 9C:
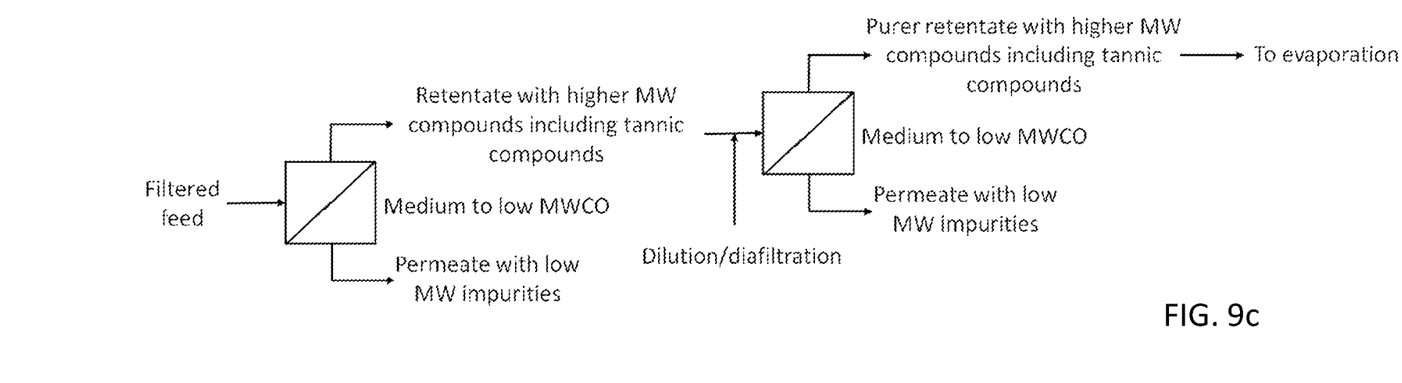
Figure 9D:
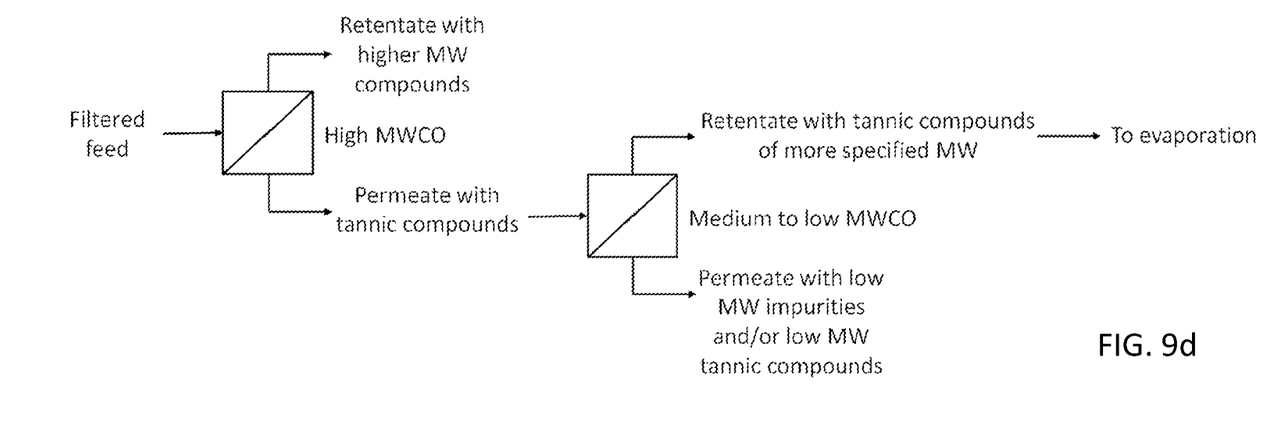

However, as shown in FIG. 8, the second fraction of purified bark press water may, as an alternative, be subjected to fractionation by distillation (Step g) to provide at least two different distillation fractions, or at least three different distillation fractions. The different distillation fractions may comprise highly valuable products.

As shown in FIGS. 2-8, the disclosed method may further comprise addition of sulphite salt (step c), and the sulphite salt may be added within the range of 4-25% by weight, within the range of 4-24% by weight, within a range of 4-22% by weight, within a range of 5-20% by weight, or within a range of 10-15% by weight. These ranges are given as dry weight sulphite salt versus dry weight tannic compound within the concentrated bark press water. The sulphite salt may be added to the concentrated bark press water as a solution, preferably with more than 10% dry weight, more than 20% dry weight, or more than 30% dry weight.

Figure 3:
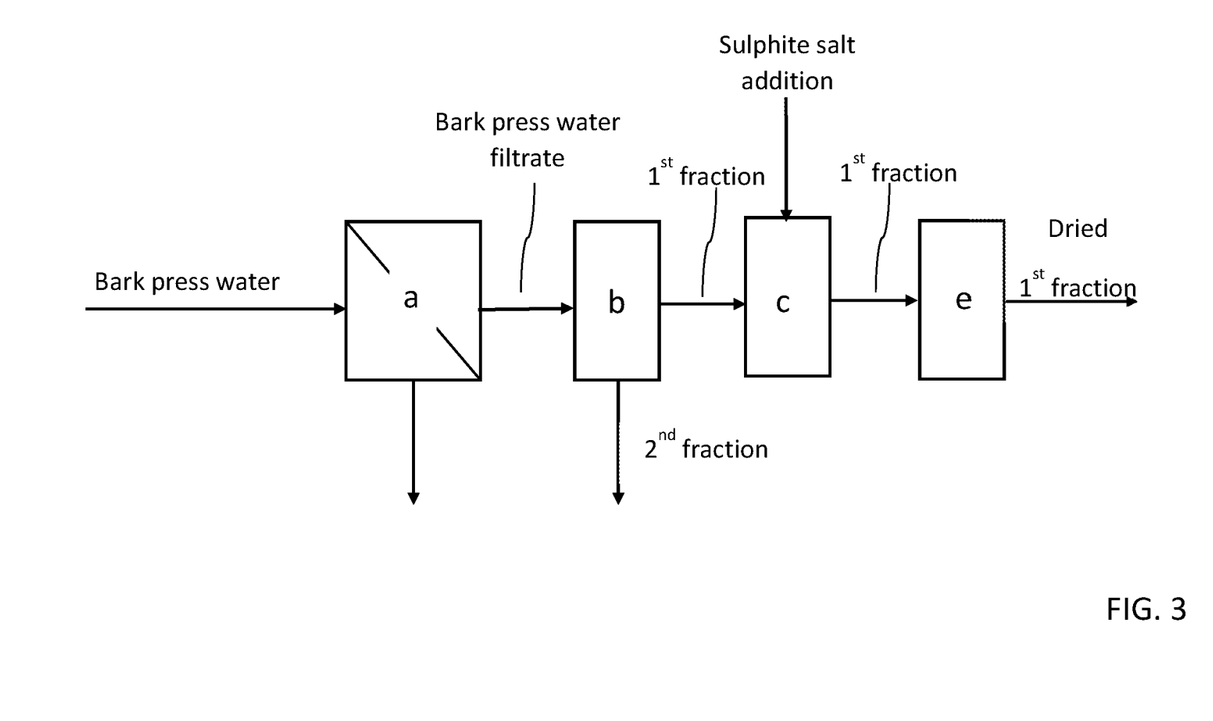
Figure 4:
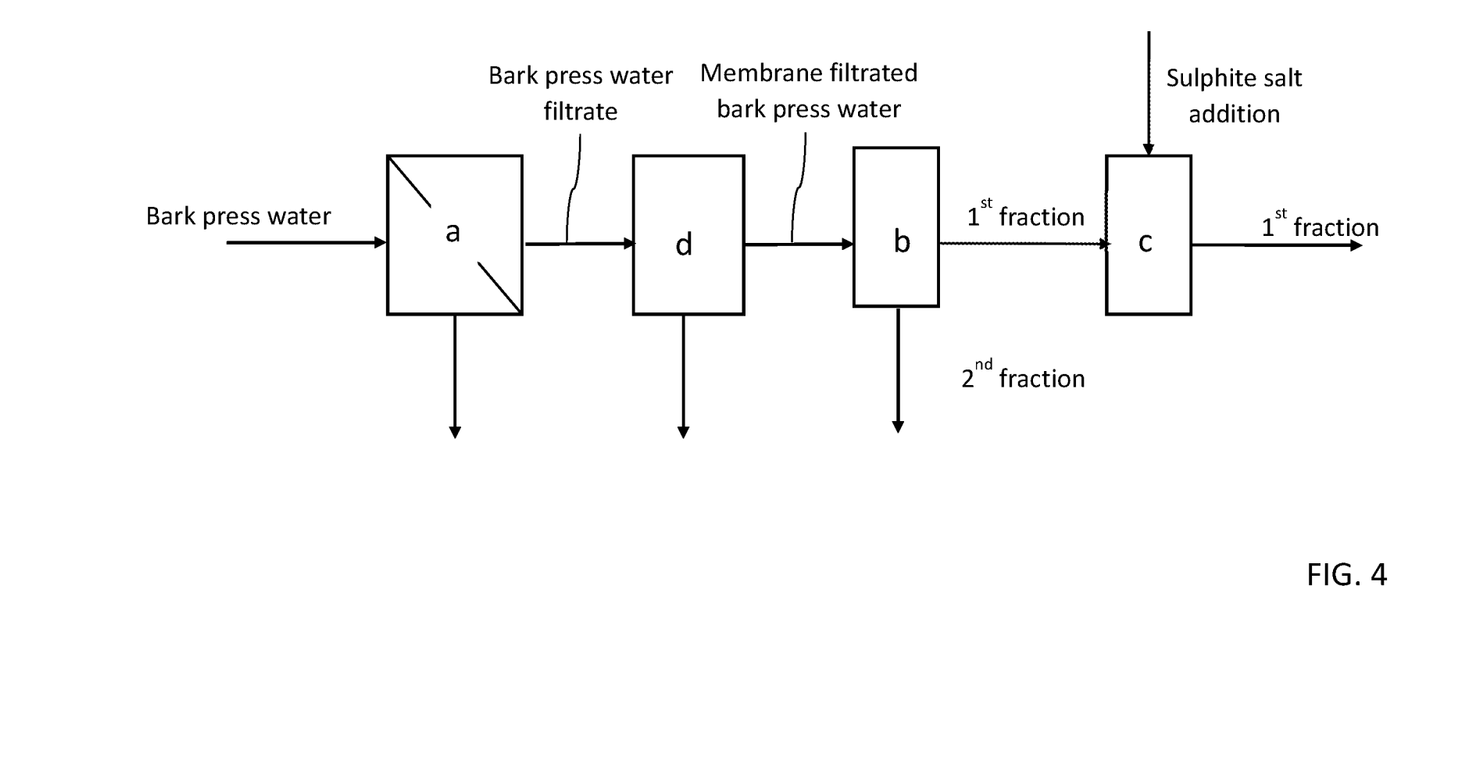
Figure 5:
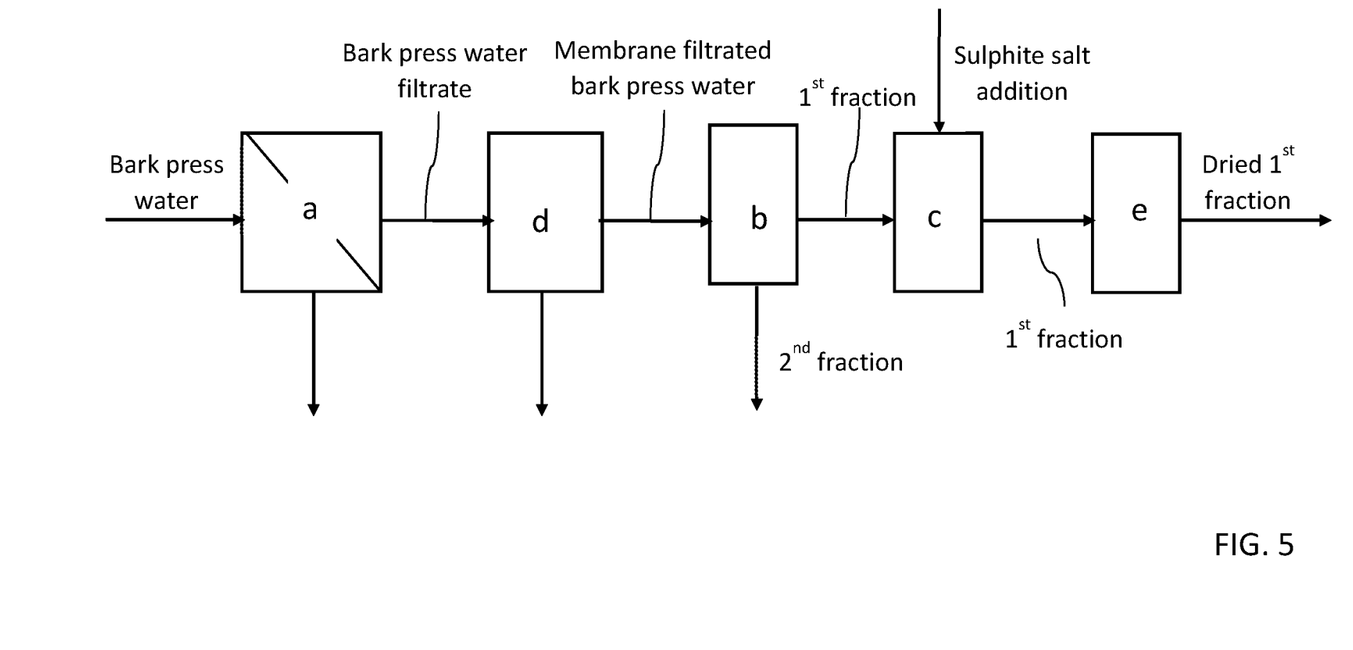
Figure 6:
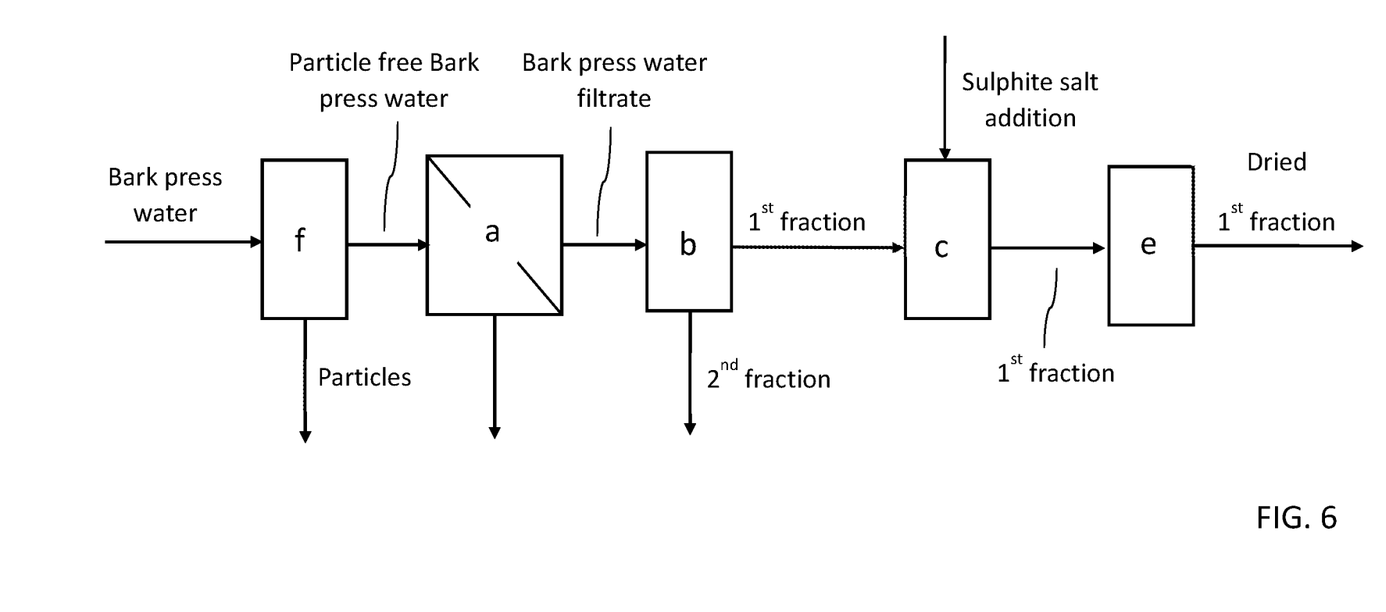

As shown in FIGS. 3, and 5-6, the disclosed method may further comprise drying the first fraction of concentrated bark press water (step e) for providing a dried first fraction in form of a dry powder product comprising tannic compounds. The drying may be spray drying or freeze drying. In one embodiment the drying is spray drying, and in one embodiment the spray drying includes agglomeration of particles. During spray drying the temperature of in-coming air may have a temperature within the range of 150-250° C., or within the range of 180-220° C., and out-coming air may have a temperature within the range of 75-100° C., or within the range of 80-95° C. In one embodiment the dry powder product has a moisture level below 10%, below 5% or below 3%.

Figure 7:
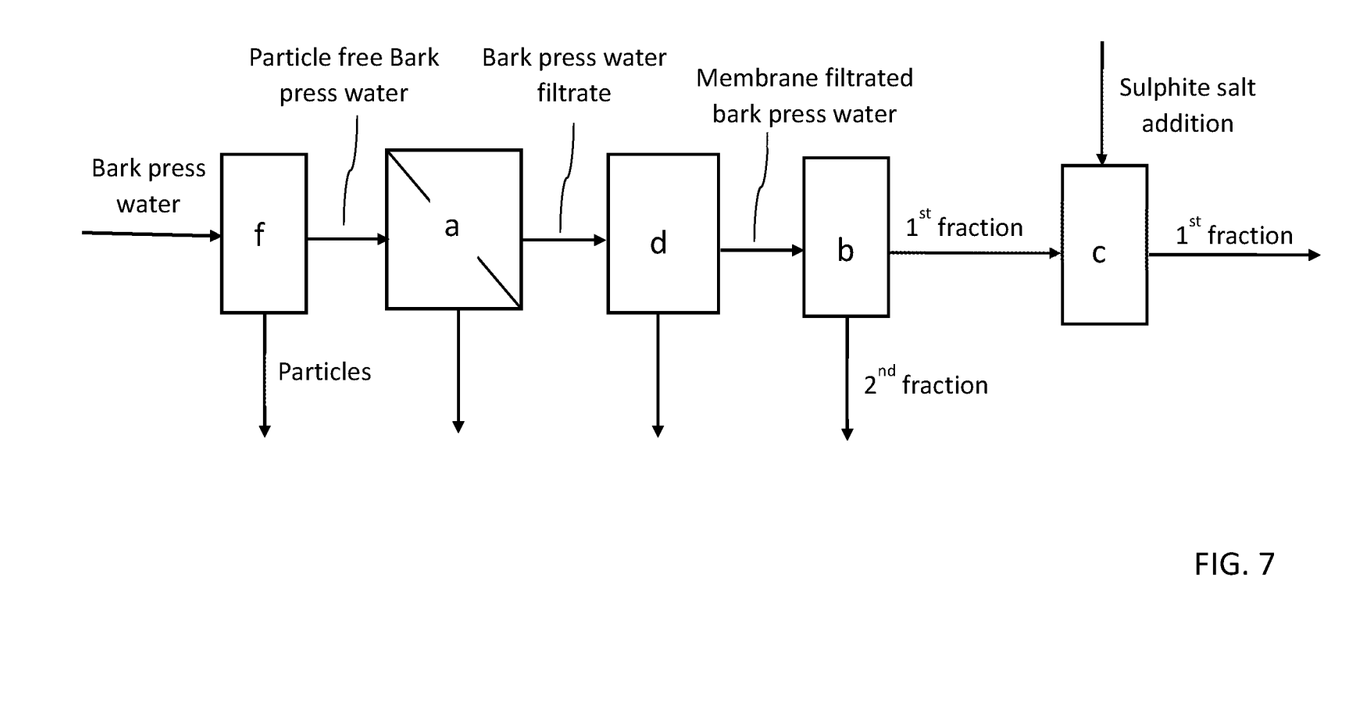

Further, as shown in FIGS. 6-8, the disclosed method may further comprise removal of larger solid particles (step f) before filtering the bark press water (step a). Thus, the incoming bark press water from the sawmill and/or pulp mill is first subjected for removal of solid particles (step f) before being filtered (step a). The removal of particles (step f) may be provided by sedimentation, by screening and/or by centrifugation. Such particles may comprise bark residues, needles and/or sand.

As discussed above, and as shown in FIGS. 4, 5, 7, and 8, the bark press water filtrate from step a) may, before step b), be subjected to membrane filtration (step d).

With the utilization of membrane filtration between step a) and step b), the variations in the incoming bark press water composition being due to process and/or raw material composition (eg. tannic compound content of bark, tannin compound composition of bark) may be evened out even more, but it may also provide for the possibility to produce products with tannic compounds with tailored compositions.

The membrane filtration (step d) may be setup in one or several stages with or without interstage dilution (diafiltration) and using one or several membrane molecular weight cut-offs in these stages. In FIGS. 9a-d different alternatives for the membrane filtration step d) are given as illustration thereof, wherein the "filtered feed" means "filtered bark press water" from step a), and the feed marked with "to evaporation" is membrane filtrated bark press water, which is processed further in step b). The term MWCO used in FIGS. 9a-d, stands for molecular weight cut-off and refers to the lowest molecular weight solute (in Daltons) in which 90% of the solute is retained by the membrane, or the molecular weight of the molecule that is 90% retained by the membrane. The membrane filtration may be configured to adjust salt content, dissolved sugar content, polysaccharide content of the filtered bark press water prior to evaporation and thereby in the main product. One benefit of always using evaporation in combination with membrane filtration, and not only membrane filtration, is that the flux during membrane filtration often is low when reaching higher dry solids content. Also from evaporation, a pure condensate is produced which may be used as an energy and water source eg. in the sawmill or the pulp mill. When the main product (first fraction) is used for tanning purposes it needs to be even from time to time and not vary too much in terms of tanning capacity. For other applications such as adhesives or specialty chemicals a narrow molecular weight distribution of the tannic compounds in the product may be important. This may be solved by combining filtration, membrane filtration and evaporation. By the term membrane filtration is meant microfiltration and/or ultrafiltration and/or nanofiltration.

EXAMPLES

The present invention will now be illustrated by way of non-limiting examples in order to further facilitate the understanding of the disclosed method.

Example 1

Analysis and investigation concerning the tannin content within bark press water samples gather during the period February to March 2021.

The bark press water used in the example, was from full scale pulp mill production, using approximately 80% spruce and 20% pine wood, respectively as raw material.

The samples were screened for removal of particles such as smaller bark residues, needles and sand (step f). A 1 mm screen was used for this removal of particles. Thereafter the sample was filtered using a 100 μm filter (004 VS-Monodur PA 100N) (step a).

The results are shown in table 1 below:

TABLE 1

Analysis of bark press water February-March 2021

| Sample | Screening,[1] g/L | Filtration,[1] g/L | Dry content[2] g/L | Tannin[2] g/L | Tannin conc[2] % | Tannin[2] % |
|---|---|---|---|---|---|---|
| 1702 | 0.12 | 0.94 | 14.8 | 9 | 0.9 | 61 |
| 2502 | 0.12 | 1.21 | 26.4 | 16.9 | 1.7 | 64 |
| 0403 | 0.39 | 1.11 | 22.5 | 15 | 1.5 | 67 |
| 1103 | 0.24 | 0.9 | 26.5 | 15.8 | 1.6 | 59 |
| 1203 | 0.98 | 1.82 | 26.7 | 15.9 | 1.6 | 59 |
| Mean | 0.37 | 1.2 | 23.4 | 14.5 | 1.452 | 62 |

[1] Removed dry content
[2] in particle free bark press water,

The result from table 1 show that the dry content within the particle free bark press water is 23.4 g/L and that 62% of the content is tannin compounds.

Thus, should this bark press water be used for the disclosed method, and if the amount of bark press water used in this process is 8t/h, then about 9 tons per day of 50% condensate may be provided from such a bark press water, which would be a huge improvement both when considering environmental footprint, but also on the lowered cost of wastewater handling.

The bark press water samples were analyzed for tannin content by using a spectrophotometric method. The method is based on an oxidative degradation of the tannin to red antocyanidine, which is quantified by absorbancy at the wavelength of 550 nm. Two solutions were prepared, one made by 950 ml n-butanol mixed with 50 ml concentrated hydrochloric acid and one made by diluting 16.6 ml concentrated hydrochloric acid to 100 ml by water, followed by an addition of a ferric ammonium sulphate which has been dissolved in 25 ml 2N hydrochloric acid. In a test tube, 6 ml of n-butanol solution and 1 ml of particle free bark press water was added. After shaking, 0.2 ml of the second solution containing iron (III) was added. The test tubes were kept in boiling water bath for 60 min, then absorbancy was measured by UV-VIS spectrophotometer, Shimadzu UV—1201, and calibrated against a reference (*mimosa tannin*).

The bark press water sample 1203 was further evaporated by using a water bath heated first round bottomed flask, connected to the side of a Heidolph 1 condenser under vacuum conditions, producing a first fraction of concentrated bark press water with a concentration of 83.7% dry weight in the first round bottomed flask, and at the same time as producing a second fraction of purified bark press water with a concentration of 0.18% dry weight in a second round bottomed flask, connected at the bottom end of the Heidolpf 1 condenser.

The skilled person realises that a number of modifications of the embodiments described herein are possible without departing from the scope of the invention, which is defined in the appended claims.

The invention claimed is:
1. A method for processing a bark press water being wastewater from sawmills and/or pulp mills, wherein the method comprises
   a) filtration of the bark press water to provide a bark press water filtrate having a particle size of less than 100 μm;
   b) concentrating at least a part of the bark press water filtrate to a level of at least 10% dry weight and thereby providing a first fraction of concentrated bark press water, comprising tannic compounds; and a second fraction of purified bark press water;
   c) adding sulphite salt to the first fraction of concentrated bark press water in a level of 4-25% by weight, based on the dry weight tannic compounds within the concentrated bark press water; and
   d) fractionation by distillation of the second fraction of purified bark press water from step b) to thereby provide at least two different distillation fractions;

wherein the bark press water is obtained by a bark pressing step.

2. The method according to claim 1, wherein the bark press water filtrate is concentrated to a level of at least 20% dry weight in the first fraction of concentrated bark press water.

3. The method according to claim 2, wherein the bark press water filtrate is concentrated to a level of at least 30% dry weight in the first fraction of concentrated bark press water.

4. The method according to claim 3, wherein the bark press water filtrate is concentrated to a level of at least 40% dry weight in the first fraction of concentrated bark press water.

5. The method according to claim 4, wherein the bark press water filtrate is concentrated to a level of at least 50% dry weight in the first fraction of concentrated bark press water.

6. The method according to claim 5, wherein the bark press water filtrate is concentrated to a level of at least 60% dry weight in the first fraction of concentrated bark press water.

7. The method according to claim 1, wherein the bark press water filtrate after step a) has a particle size of less than 50 μm.

8. The method according to claim 1, wherein a part of the bark press water filtrate from step a) is returned to the sawmill or pulp mill for a debarking step and/or the bark pressing step.

9. The method according to claim 1, wherein the sulphite salt is added to the first fraction of concentrated bark press water in a level within a range of 4-24% by weight, based on the dry weight tannic compounds within the concentrated bark press water.

10. The method according to claim 9, wherein the sulphite salt is added to the first fraction of concentrated bark press water in a level within a range of 4-22% by weight, based on the dry weight tannic compounds within the concentrated bark press water.

11. The method according to claim 10, wherein the sulphite salt is added to the first fraction of concentrated bark press water in a level within a range of 5-20% by weight, based on the dry weight tannic compounds within the concentrated bark press water.

12. The method according to claim 11, wherein the sulphite salt is added to the first fraction of concentrated bark press water in a level within a range of 10-15% by weight, based on the dry weight tannic compounds within the concentrated bark press water.

13. The method according to claim 1, further comprising drying the first fraction of concentrated bark press water for providing a dry powder product comprising tannic compounds.

14. The method according to claim 1, wherein the bark press water, before the filtration step a), is subjected to removal of solid particles, in form of stones, bark residues, and/or needles.

15. The method according to claim 14, which removal is provided by sedimentation, by screening and/or by centrifugation.

16. The method according to claim 1, wherein the concentrating step b) is provided by evaporation.

17. The method according to claim 16, wherein the evaporation is performed at a temperature below 80° C.

18. The method according to claim 17, wherein the evaporation is performed at a temperature below 70° C.

19. The method according to claim 1, wherein the bark press water filtrate from step a) is, before step b), subjected to membrane filtration.

20. The method according to claim 1, wherein the second fraction of purified bark press water is returned to the sawmill and/or pulp mill as replacement of process water, as heating fluid or for heat exchanging.

* * * * *